Patented July 3, 1934

1,964,768

UNITED STATES PATENT OFFICE 1,964,768

MANUFACTURE OF PHENOLS

Walter Prahl and Wilhelm Mathes, Ludwigshafen-on-the-Rhine, Germany, assignors to Dr. F. Raschig G. m. b. H., Ludwigshafen-on-the-Rhine, Germany, a firm of Germany No Drawing. Application June 13, 1933, Serial No. 675,526. In Germany June 18, 1932

16 Claims. (Cl. 260—154)

It is known that phenol and its homologues can be made from chlorobenzene and its homologues by treatment with steam at a raised temperature in the presence of a compound of an element of groups 1—4 of the periodic system whose oxide has a basic character, this compound serving as a catalyst.

The present invention is based on the discovery that of the many compounds of elements of groups 1—4 of the periodic system the compounds of phosphoric acid and elements of group 2 of the periodic system are quite generally remarkably suited for use as catalysts in the manufacture of aromatic hydroxy-compounds from the corresponding chlorinated aromatic hydrocarbons. The catalytic properties are especially pronounced in the case of neutral phosphoric acid compounds of alkaline earth metals and above all in the case of tricalcium phosphate.

These compounds combine when used as catalysts the ability to give good yields even at a high degree of conversion, with a very high activity, that is to say the capacity for treating relatively large quantities of material at a given temperature and with a given volume of the vessel containing the catalyst.

The technical advantage attained by the use of these compounds as catalysts depends chiefly on this exceptionally high activity, since with their aid it is possible either to produce substantially more phenol in unit time with the same quantity of catalyst and at the same temperature, or to maintain the reaction temperature considerably lower whilst attaining the same rate of production of phenol; in the first case there is the possibility of using a substantially smaller apparatus and in the second case the possibility of operating at lower temperatures, in each case with the attendant advantages.

It is of particular advantage to incorporate in the catalysts certain additional substances which improve the catalytic action. As such additional substances the compounds of copper or their equivalents (heavy metals: nickel, cobalt, silver, gold and the metals of the platinum group) come into question.

The best results are obtained when neutral salts of phosphoric acid and alkaline earth metals, especially tricalcium phosphate, are used in admixture with compounds of copper.

The temperatures at which the reaction can be carried out must exceed 350° C. and preferably do not exceed 650° C.

The following examples illustrate the invention:—

Example 1

280 cc. of phosphoric acid of 59.5° Bé. are diluted with 70 litres of water. 1.05 litres of aqueous ammonia of specific gravity 0.91 are diluted with 5 litres of water, and 1.300 grams of hydrated calcium chloride are dissolved in 25 litres of water. In order to prepare the catalyst the solution of ammonia is mixed with the solution of phosphoric acid and in the course of about one hour the calcium chloride solution is allowed to run into the mixed solutions whilst stirring continuously and energetically. There is produced a precipitate of tricalcium phosphate which is filtered by suction and is freed from the bulk of the impurities by repeated washing with water. After the mass has been dried as much as possible by suction it is advantageously slowly dried by means of heated air and then heated for 24 hours at 500° C. During the process of drying the mass disintegrates into grains of about the size of a pea or bean, which are of considerable hardness, are translucent like porcelain and show a lustrous conchoidal fracture.

The vapors of 750 grams of chlorobenzene and 750 grams of water are passed per hour over one litre of the catalyst thus prepared at a temperature of 480° C. 100 grams of phenol are obtained per hour with a yield of 90 per cent of theory.

Example 2

By appropriate modification of the procedure described in Example 1 there is prepared a catalyst consisting of magnesium phosphate. Over 1 litre of this catalyst there are passed at 450° C. the vapors of 400 grams of chlorobenzene and 400 grams of water. 60 grams of phenol are produced per hour in a yield of 85 per cent of theory.

Example 3

Over 500 cc. of a catalyst made as described in Example 1 there are passed at 480° C. the vapors of 220 grams of para-chlorotoluene and 220 grams of water per hour. 35 grams of paracresol are isolated per hour in a yield of 90 per cent of theory.

Example 4

In the procedure described in Example 1 there is added to the calcium chloride solution before the precipitation a solution of 20 grams of cupric chloride in a small quantity of water, the further procedure for making the catalyst being as described in that example. The vapors of 130 grams of α-chlornaphthalene and 130 grams of water are passed per hour at 400° C. over 250 cc. of the catalyst. 15 grams of α-naphthol are obtained per hour in a yield of 89 per cent of theory.

Example 5

The vapors of 300 grams of para-chlorodiphenyl and 300 grams of water are passed per hour at 420° C. over 500 cc. of a catalyst made as described in Example 4. 40 grams of para-oxydiphenyl are obtained per hour in a yield exceeding 90 per cent of theory.

We claim:—

1. The process of producing aromatic hydroxy-compounds comprising the treatment of a ring-chlorinated aromatic hydrocarbon with steam at temperatures exceeding 350° C. in the presence of a compound of phosphoric acid with an element of group 2 of the periodic system as a catalyst.

2. The process for producing aromatic hydroxy-compounds comprising the treatment of a ring-chlorinated aromatic hydrocarbon with steam at temperatures exceeding 350° C. in the presence of a neutral phosphoric acid compound of an alkaline earth metal as a catalyst.

3. The process for producing aromatic hydroxy-compounds comprising the treatment of a ring-chlorinated aromatic hydrocarbon with steam at temperatures exceeding 350° C. in the presence of tricalcium phosphate as a catalyst.

4. The process for producing phenol comprising the treatment of chlorobenzene with steam at temperatures exceeding 350° C. in the presence of tricalcium phosphate as a catalyst.

5. The process for producing aromatic hydroxy-compounds comprising the treatment of a ring-chlorinated aromatic hydrocarbon with steam at temperatures exceeding 350° C. in the presence of a compound of phosphoric acid with an element of group 2 of the periodic system as a catalyst to which catalyst a compound of copper has been added.

6. The process for producing aromatic hydroxy-compounds comprising the treatment of a ring-chlorinated aromatic hydrocarbon with steam at temperatures exceeding 350° C. in the presence of a neutral phosphoric acid compound of an alkaline earth metal as a catalyst to which catalyst a compound of copper has been added.

7. The process for producing aromatic hydroxy-compounds comprising the treatment of a ring-chlorinated aromatic hydrocarbon with steam at temperatures exceeding 350° C. in the presence of tricalcium phosphate as a catalyst to which catalyst a compound of copper has been added.

8. The process for producing phenol comprising the treatment of chlorobenzene with steam at temperatures exceeding 350° C. in the presence of tricalcium phosphate as a catalyst to which catalyst a compound of copper has been added.

9. The process for producing aromatic hydroxy-compounds comprising the treatment of a ring-chlorinated aromatic hydrocarbon with steam at temperatures between 350 and 650° C. in the presence of a compound of phosphoric acid with an element of group 2 of the periodic system as a catalyst.

10. The process for producing aromatic hydroxy-compounds comprising the treatment of a ring-chlorinated aromatic hydrocarbon with steam at temperatures between 350 and 650° C. in the presence of a neutral phosphoric acid compound of an alkaline earth metal as a catalyst.

11. The process for producing aromatic hydroxy-compounds comprising the treatment of a ring-chlorinated aromatic hydrocarbon with steam at temperatures between 350 and 650° C. in the presence of tricalcium phosphate as a catalyst.

12. The process for producing phenol comprising the treatment of chlorobenzene with steam at temperatures between 350 and 650° C. in the presence of tricalcium phosphate as a catalyst.

13. The process for producing aromatic hydroxy-compounds comprising the treatment of a ring-chlorinated aromatic hydrocarbon with steam at temperatures between 350 and 650° C. in the presence of a compound of phosphoric acid with an element of group 2 of the periodic system as a catalyst to which catalyst a compound of copper has been added.

14. The process for producing aromatic hydroxy-compounds comprising the treatment of a ring-chlorinated aromatic hydrocarbon with steam at temperatures between 350 and 650° C. in the presence of a neutral phosphoric acid compound of an alkaline earth metal as a catalyst to which catalyst a compound of copper has been added.

15. The process for producing aromatic hydroxy-compounds comprising the treatment of a ring-chlorinated aromatic hydrocarbon with steam at temperatures between 350 and 650° C. in the presence of tricalcium phosphate as a catalyst to which catalyst a compound of copper has been added.

16. The process for producing phenol comprising the treatment of chlorobenzene with steam at temperatures between 350 and 650° C. in the presence of tricalcium phosphate as a catalyst to which catalyst a compound of copper has been added.

WALTER PRAHL.
WILHELM MATHES.